(12) United States Patent
Koller et al.

(10) Patent No.: US 7,999,226 B1
(45) Date of Patent: Aug. 16, 2011

(54) INFRARED SENSOR ASSEMBLY AND SPEAKER SUPPORT

(75) Inventors: Thomas J. Koller, Beaverton, OR (US); Jerry C. Ramey, Beaverton, OR (US)

(73) Assignee: Lightspeed Technologies, Inc., Tualatin, OR (US)

( * ) Notice: Subject to any disclaimer, the term of this patent is extended or adjusted under 35 U.S.C. 154(b) by 1117 days.

(21) Appl. No.: 11/805,986

(22) Filed: May 25, 2007

(51) Int. Cl.
*G01J 5/06* (2006.01)
(52) U.S. Cl. .................................... 250/338.1
(58) Field of Classification Search ............... 250/336.1, 250/338.1, 347, 353, 354.1; 381/77, 82, 381/189, 386, 396
See application file for complete search history.

(56) References Cited

U.S. PATENT DOCUMENTS

| 6,741,720 | B1 * | 5/2004 | Myatt | 381/386 |
| 7,079,028 | B2 * | 7/2006 | Herrmann et al. | 340/541 |
| 2004/0234088 | A1 * | 11/2004 | McCarty et al. | 381/306 |
| 2006/0065859 | A1 * | 3/2006 | Lapstun et al. | 250/566 |

* cited by examiner

*Primary Examiner* — David P Porta
*Assistant Examiner* — Marcus H Taningco
(74) *Attorney, Agent, or Firm* — Klarquist Sparkman, LLP

(57) ABSTRACT

A portable infrared sensor and speaker assembly is described which, in one form, includes an elongated array of infrared sensors along respective first and second side portions of a speaker. Infrared reflective surfaces, which may include a portion of the side surface of the speaker, enhance the detection of infrared signals by the sensors. This technology can be used, for example, in infrared signal amplification systems for amplifying a speaker's voice in a classroom or auditorium.

21 Claims, 5 Drawing Sheets

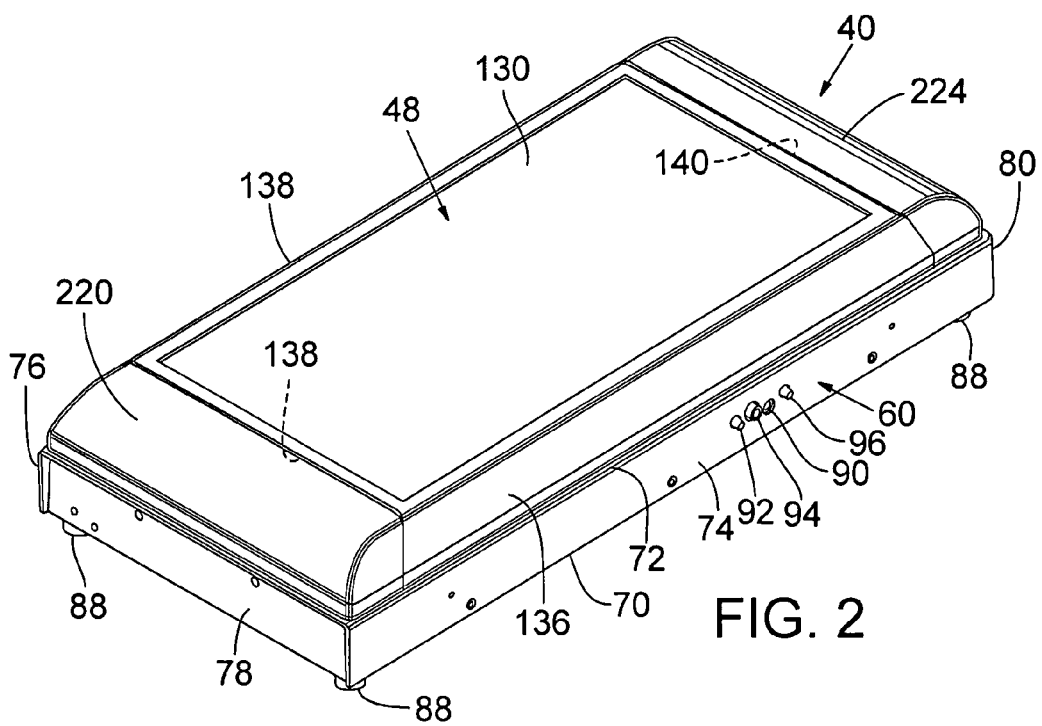
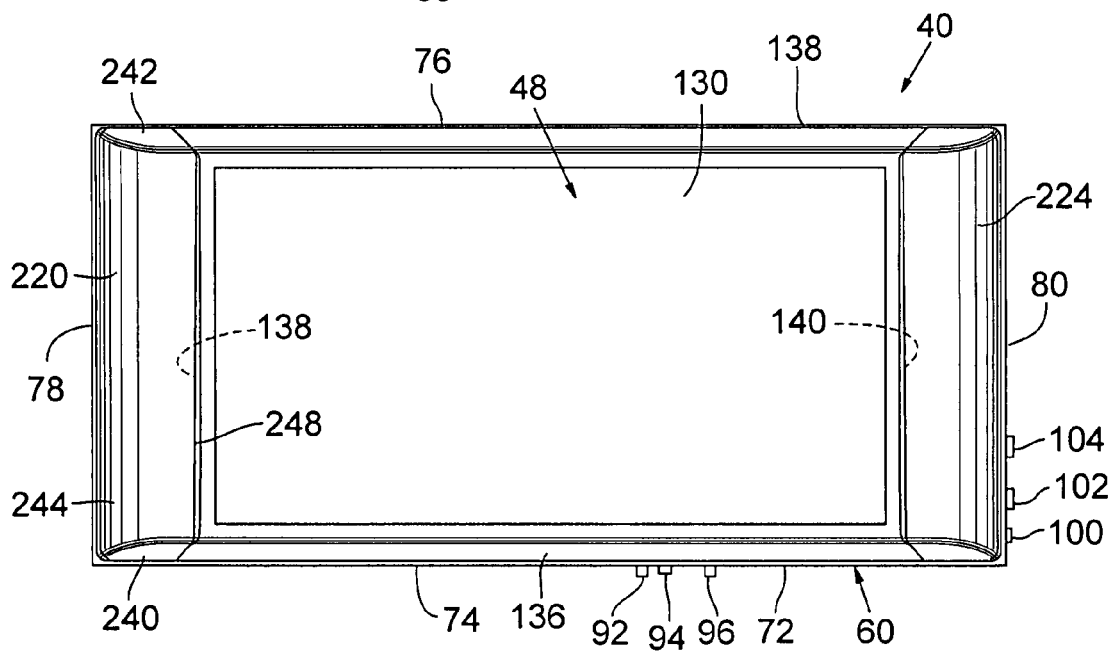

INFRARED SENSOR ASSEMBLY AND SPEAKER SUPPORT

TECHNICAL FIELD

The technology disclosed herein relates to infrared signal based amplification systems such as can be used in a classroom or auditorium environment for amplifying the voice of one or more presenters. More specifically, the technology relates to a supported infrared sensor assembly and speaker arrangement for an infrared amplification system.

BACKGROUND

One prior art infrared amplification system provided by Lightspeed Technologies, Inc., for uses, such as in a classroom, includes one or more microphones for converting a presenter's voice into infrared signal representations thereof and transmitting these infrared signals to an infrared receiver. In this known embodiment, the infrared receiver is mounted to the ceiling of a room. This receiver has a black colored base on which a circular array of infrared signal sensors, in this case diodes, is placed. The array of diodes is formed by a first circle of 16 diodes extending perpendicularly outwardly from the base. A surrounding circle 16 of diodes is also included with the diodes of the surrounding circle being tilted inwardly at a 45 degree angle to create a circular array 32 of diodes of vertically positioned diodes that each have an angled diode therebetween. A red circular dome infrared lens overlies the diode array. An apertured RF signal shield is interposed between the infrared lens and diodes of the array. The infrared receiver is connected by electrical wires to an amplifier which in turn is connected to a speaker with both the amplifier and speaker being at remote locations from the receiver. The receiver is capable of receiving signals from more than one channel (16 diodes per channel) that are separated for amplification. Various components can be coupled to the amplifier such as a VCR or DVD to provide additional signal sources for the amplifier and speaker. A bending wave speaker from New Transducers Limited (a NXT™ speaker) is one example of a suitable speaker that has been used in such a system.

Although offering many advantages, a system such as described above can be expensive and time consuming to install. In addition, there are other disadvantages associated with such a system.

Therefore, a need exists for improvements in infrared signal based amplification systems.

SUMMARY

In accordance with one aspect of the technology disclosed herein, a portable infrared signal sensing, processing and speaker assembly is disclosed that is easy to set up and use and is easy to move from location to location, such as from one classroom to another classroom depending upon the needs of a school.

As yet another aspect of the disclosed technology, infrared sensors positioned along the sides of a speaker can be utilized with the device supported on a base or wall to orient the sensors in an upright and more desirably vertical orientation for enhanced infrared signal detection.

As a more specific aspect of an example of the disclosed technology, an exemplary infrared sensor assembly and speaker support can comprise a base; a speaker coupled to the base, the speaker comprising a front surface, a back surface, first and second side surfaces and top and bottom surfaces; the base comprising first and second infrared sensor support surfaces projecting outwardly beyond the respective first and second speaker side surfaces; a first sensor support coupled to the first sensor support surface and a second sensor support coupled to the second sensor support surface; a first elongated sensor array comprising a plurality of infrared signal sensors associated with and supported by the first sensor support along one side of the speaker and a second elongated sensor array comprising a plurality of infrared signal sensors associated with and supported by the second sensor support along the opposite side of the speaker; a first interfering signal shield positioned and operable to shield the first elongated array from infrared interference signals and a second interfering signal shield positioned and operable to shield the first elongated array from infrared interference signals; a first infrared signal passing lens overlaying the first elongated array and a second infrared signal passing lens overlaying the second elongated array; and a first infrared signal reflective surface positioned at least in part beneath the first lens to reflect infrared signals toward the infrared signal sensors of the first array and a second infrared signal reflective surface positioned at least in part beneath the second lens so as to reflect infrared signals toward the infrared signal sensors of the second array.

As a further aspect of the technology, the first and second infrared signal reflecting surfaces can comprise a surface extending outwardly in a direction away from the associated sensor support surfaces and toward a surface intersecting the front surface of the speaker. These surfaces can be portions of the side surfaces of the speaker and are desirably of an infrared reflecting color, such as a white color. The infrared reflecting surfaces can also comprises portions of the infrared sensor support surfaces.

As another aspect of the technology, the lenses can each have an elongated arcuate portion and be positioned to overlie the reflective surfaces and to block light from reaching the sensors except through the lenses.

As yet another aspect of the technology, the speaker can be rectangular with the first and second elongated sensor arrays being adjacent to respective speaker side surfaces.

As another specific example of the disclosed technology, an exemplary infrared sensor assembly and speaker support can comprise a base comprising a top edge, a bottom edge and first and second side edges, the base also can comprise an outwardly facing speaker mounting surface; a speaker can be coupled to the speaker mounting surface, the speaker having first and second speaker side portions, the base being wider than the speaker such that first and second projecting side portions of the base project outwardly beyond the respective first and second speaker side portions, a first array comprising plural infrared signal sensors carried by the first projecting side portions and positioned along the first speaker side portion, a second array comprising plural infrared signal sensors carried by the second projecting side portions and positioned along the second speaker side portion, and wherein at least portions of first and second speaker side portions are white. In this example, the speaker can also be rectangular and all of the infrared signal sensors of the apparatus can be included in the first and second arrays. The base in this example is desirably adapted for support with the speaker side portions and arrays in an upright orientation.

Additional features and aspects of the disclosed technology are described below. The invention is directed toward all novel and non-obvious aspects of the technology disclosed herein both alone and in combinations and sub-combinations with one another.

BRIEF DESCRIPTION OF THE DRAWINGS

FIG. 2 is a perspective view, looking generally upwardly from the bottom left in this figure, of an exemplary infrared sensor assembly and speaker support in accordance with this disclosure.

FIG. 3 is a front view of the embodiment of FIG. 1.

DETAILED DESCRIPTION

The description below proceeds with reference to several embodiments. These are exemplary embodiments only and are not to be viewed as limiting the scope of the invention disclosed herein.

Figure 1:
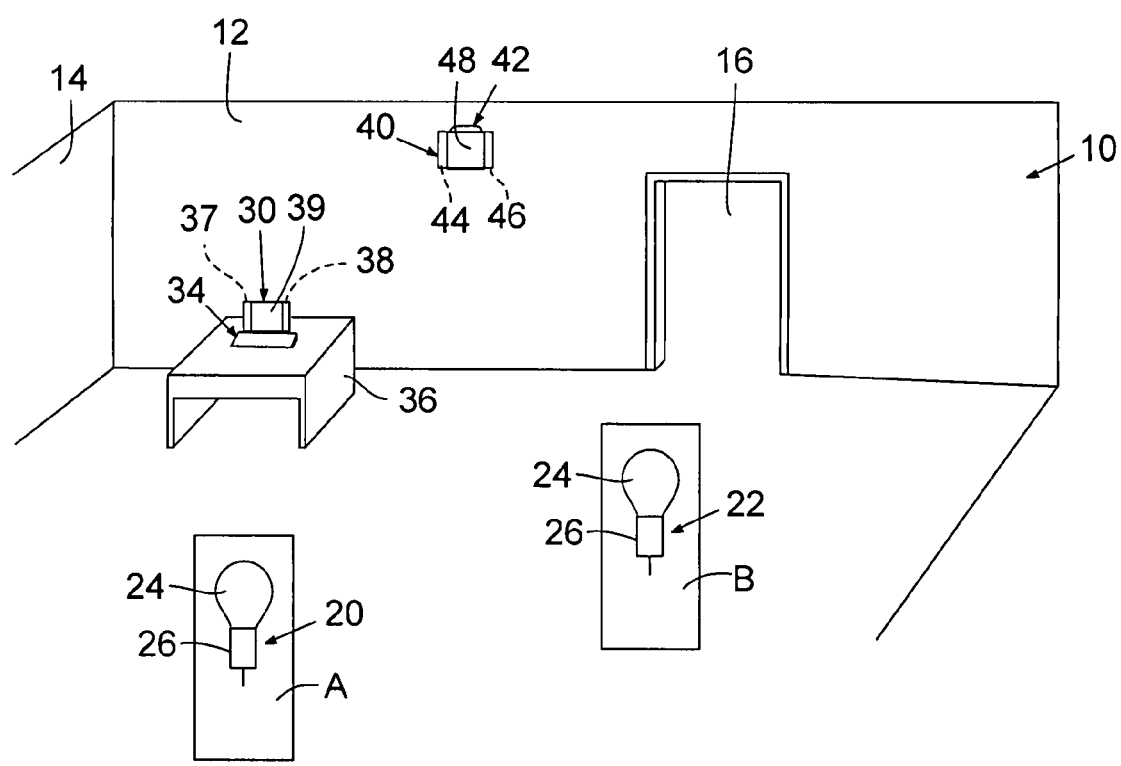
FIG. 1 is a schematic illustration of a classroom within which exemplary locations for components of exemplary embodiments of an infrared speaker assembly and speaker support as disclosed herein are shown.

With reference to FIG. 1, an exemplary environment within which the technology can be used is shown and comprises a classroom 10 having upright walls 12,14 with a doorway 16 through which ingress and egress to the classroom is provided. One or more speakers or lecturers may be making a presentation in the classroom. In the FIG. 1 example, a first lecturer A represented schematically by a box is shown together with a second lecturer B, again schematically represented by a box. Speaker A is equipped with an infrared microphone/transmitter 20 while speaker B is equipped with a similar microphone infrared transmitter 22. Although not required, the illustrated microphone/transmitters 20,22 each include a necklace 24 for positioning around the speaker's neck from which the microphone/transmitter 26 is suspended. The speaker's voice is converted to infrared signal representations thereof in a conventional manner, which are then transmitted to an infrared signal sensor speaker assembly 30,40. Typically, only one assembly 30 or 40 is included in a room. Two are shown in FIG. 1 simply to illustrate exemplary upright orientations of these assemblies. Thus, assembly 30 is shown supported by a stand 34 on a desk 36. In contrast, assembly 40 is shown hung by a bracket 42 from the wall 12. The base is thus adapted for support with an upright orientation of the array and sensors. The illustrated assembly 30 comprises first and second elongated infrared signal sensor arrays 37,38 positioned along the respect sides of the assembly with a speaker 39 positioned between the sensor arrays. Similarly, assembly 40 comprises first and second infrared signal sensor arrays 44,46 positioned along the sides of a speaker 48. Dashed lead lines are shown leading to the sensor arrays 37,38 and 44,46 to indicate that these sensor arrays are typically positioned internally within the assembly as explained below.

It should be noted that other orientations and configurations of infrared sensors can be used. However, by using an elongated array of upright oriented sensors (that is sensors arranged in top to bottom spacing along the sides of a speaker), such as in one or more vertically oriented rows of sensors in a linear array, enhanced infrared signal detection results. An upright sensor array also assists in cooling the array through enhanced convection and heat sinking. Also, although any type of speaker can be used, a bending wave speaker assists in confining the sound into the room to which it is directed. For example, in FIG. 10, both of the speakers 39 and 48 are shown facing forwardly into the room. With this orientation, sound would be directed toward the audience in the room and away from the doorway 16. This minimizes undesirable cross room audio.

Referring again to FIG. 1, lecturers A and B can be using microphones for providing infrared transmitted signals on different channels, e.g., at different frequencies, which can then be separated at a receiver for individual processing, such as to allow independent volume adjustment of the audio from the two channels in the same manner that was used in the prior art Lightspeed Technologies, Inc. apparatus discussed above. However, in one specific array described below, there can be thirty-two sensors (16 at each side of a speaker) per channel to provide enhanced performance.

Figure 4:
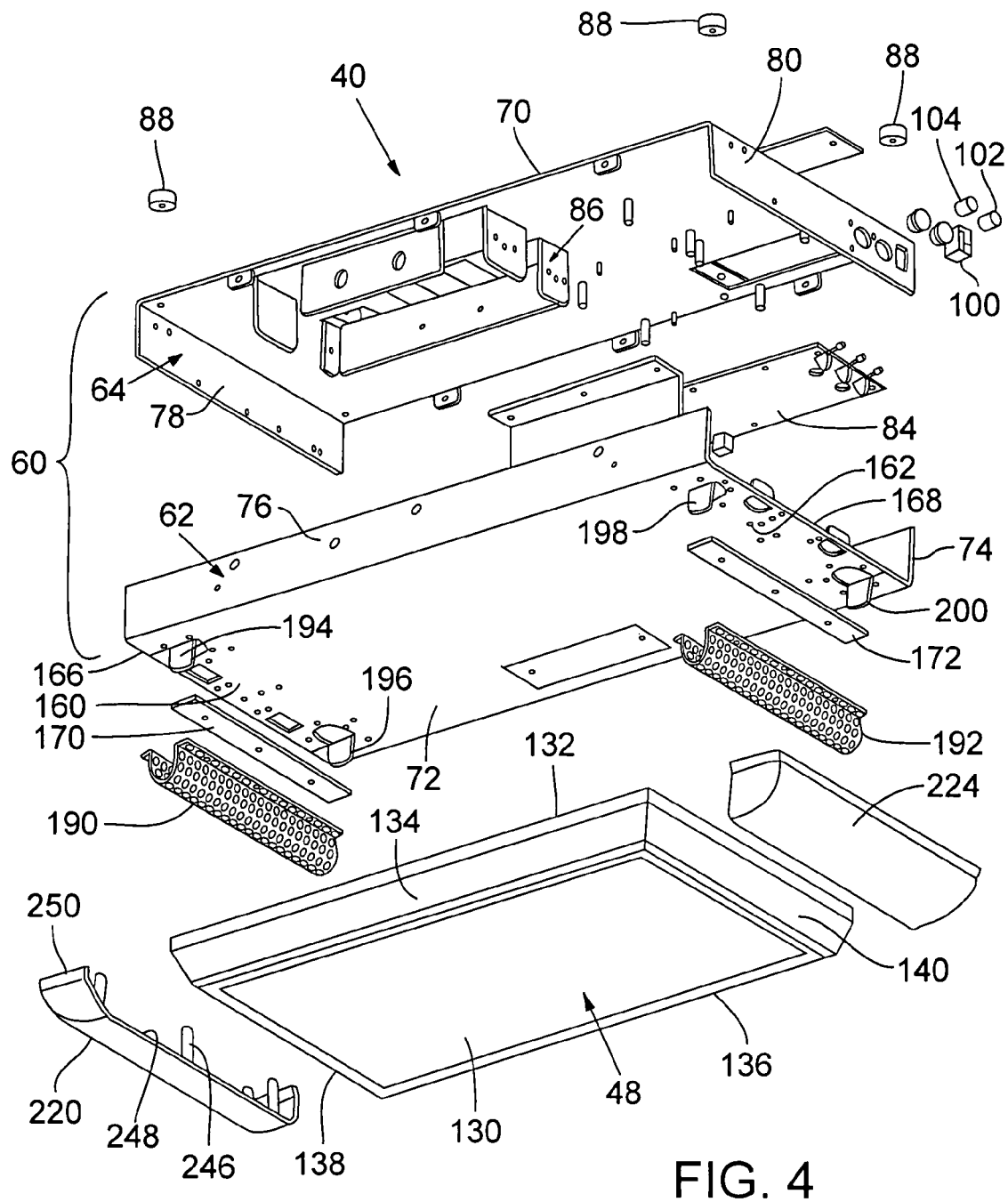
FIG. 4 is an exploded view of exemplary components that can be included in the embodiment of FIG. 1.

With reference to FIGS. 2-4, the illustrated assembly 40 comprises a base 60 to which a speaker 48 is mounted. The base 60 can be of plural piece construction such as comprised of upper and lower base sections 62,64 as shown in FIG. 4. The illustrated base comprises a back surface 70, a front or speaker mounting surface 72, bottom and top surfaces 74,76 and left and right side surfaces 78,80. Thus, the illustrated base 60 is generally of a rectangular configuration that is longer in a side-to-side direction than in a top-to-bottom direction. Although variable, exemplary dimensions for base 60 are about 560 mm wide (side-to-side), 340 mm inches high (top-to-bottom) and 80 mm deep (from surface 72 to surface 70). These dimensions can be varied. In addition, it is not required that the base be rectangular in shape. Various access panels and mounting brackets and flanges for supporting circuit and other components can also be included or mounted to the base. For example, a circuit board 84 that contains receiver, filtering and amplification circuitry can be included therein. Also, power supply positioning and holding components, such as indicated at 86, can be included. The device can be battery powered or powered from another source, such as from a DC adaptor plugged into an AC source.

FIG. 2 illustrates a power input socket 90 together with input connections 92 and 96 to which components such as VCRs, DVD players and other input source devices can be connected. An output 94 for attachment of assisted hearing and/or auxiliary speaker devices can also be included. An on/off switch 100 is also carried by the base 60 together with volume controls 102,104 for the microphone channels. These volume controls can be of the type that requires them to be depressed before tuning for volume adjustment to thereby minimize the risk of accidental activation.

The illustrated speaker 48 can comprise a front surface 130 through which sound is directed into a room or other space containing the assembly 40, a rear surface 132 for mounting or coupling to the base surface 72. In addition, the speaker can comprise a top edge portion 174, a bottom edge portion 136 and respective speaker side edge portions 138,140. The illustrated speaker can be of another configuration, such as circular or of a different shape. If circular, the side surfaces of the speaker would typically be an arc of a circle. An exemplary speaker is a bending wave speaker utilizing a honeycomb panel with an exciter and soft foam around the edges. One exemplary speaker is a NXT brand speaker developed by New Transducers Limited. Other speakers are suitable, such as an Nlightn speaker from Carlsboro and speakers from TEAC Company, such as TEAC MC-DX 20B and TEAC MC-DX25 speakers. Again, the technology is not limited to a particular type of speaker, although a rectangular bending wave flat panel speaker is desirable.

Referring again to FIG. 4, the base section 74 can comprise first and second end portions 160,162 that extend or project outwardly beyond the speaker side portions 138,140 when the speaker is coupled to base section 62. In the illustrated example, end portions 160,162 include an outwardly facing surface extension of the surface 72. It should be noted that extension pieces, brackets or supports of different configurations can be included in the base to in effect extend the base beyond the side edge portions of the speaker 48. Extension portion 160 terminates in a side edge 166 in this example while extension portion 122 terminates in a side edge 168. The extension portions 160,162 comprise one example of infrared sensor support surfaces that project outwardly beyond the respective first and second speaker side surfaces. Brackets, flanges or other extensions can also be used and, once coupled to the base section 62, are considered part of the base 60.

A first elongated sensor support 170, which can comprise a circuit board strip, can be coupled to the support surface of end portion 160. A second sensor support 172, which can be like support 170, can be coupled to an outwardly facing supporting surface of end portion 162. In this description, the term "coupled" means both direct mounting of one component to another with no intervening components as well as indirect mounting of one component to another through one or more connecting components. In this case, the strip 170 abuts a portion of the outwardly facing surface of end portion 160 while strip 172 abuts a portion of the outwardly facing surface of end portion 162. At least portions of the outwardly facing surface of end portion 160 and of the outwardly facing surface of end portion 162, comprise an infrared signal reflective surface for the purposes of reflecting infrared signals toward infrared sensors mounted to the respective strips 170, 172. More desirably, the entire outwardly facing surface of end portions 160 and 162 are provided with these infrared signal reflective characteristics. In a specific approach, these infrared reflective surfaces can be a light color and are most desirably white. Desirably, white corresponding to Pantone Ink color having ninety-eight percent or more Pantone Trans. White by volume are suitable. More specific examples of desirable color is white substantially corresponding to the following range of Pantone, Inc. color descriptions with percentages being the percentage of the total volume:

1. Pantone Trans. White 100%
2. Pantone Cool Gray 1: 0.28% Pantone Black, 0.12% Pantone Blue 072, and 99.6% Pantone Trans. White.
3. Pantone Cool Gray 2: 0.70% Pantone Black, 0.30% Pantone Blue 072, and 99.00% Pantone Trans. White.
4. Pantone Cool Gray 3: 1.4% Pantone Black, 0.60% Pantone Blue 072, and 98.00% Pantone Trans. White.
5. Pantone Warm Gray 1: 0.37% Pantone Black, 0.03% Pantone Red 032, and 99.6% Pantone Trans. White.
6. Pantone Warm Gray 2: 0.92% Pantone Black, 0.08% Pantone Red 032, and 99.00% Pantone Trans. White.
7. Pantone Warm Gray 3: 1.83% Pantone Black, 0.03% Pantone Red 032, and 98.00% Pantone Trans. White.
8. Pantone 420: 0.75 part Pantone Black 1.1, 0.25 part Pantone Reflex Blue 0.4, and 64 parts Pantone Trans. White.
9. Pantone 427: 0.625 part Pantone Black 1.0, 0.375 part Pantone Reflex Blue 0.6, and 64 parts Pantone Trans. White.

Alternatively, rather than utilizing a surface of end portions 160,162, other infrared signal reflecting surface components can be coupled to these respective end portions.

The respective infrared sensor supports 170,172, which may be of other configurations, provide support for respective elongated arrays of infrared sensors. By elongated, it is meant an array of sensors that includes a plurality of sensors such as infrared detecting diodes, with a Siemens SFH213 diode being a specific example, being positioned in a lengthwise elongated pattern on the respective supports. In the illustrated example, the sensors can be positioned in an array at locations along the associated side of the speaker. The individual sensors of the arrays are not shown in FIG. 4. However, an exemplary configuration of an array is discussed below in connection with FIGS. 5 and 6. A first interfering signal shield 190 is positioned to overlie the infrared sensors on the support 170 and is operable to shield (minimize the impact on) the sensors from infrared interference signals, more specifically radio frequency signals, that otherwise can reach the sensors. The illustrated exemplary shield 190 is elongated and of a generally U-shaped construction with apertures formed therein. The shield may be formed, for example, from a sheet with honeycomb (hexagonal) apertures. The ends of the shield can be closed by outwardly projecting tabs 194,196 that project outwardly from the surface 72. The shield 192 can be like the shield 190, overlays the infrared sensors carried by strip 172, and can be closed at its respective ends by closure members or tabs 198,200.

With reference to FIG. 4, at least a portion of, and more desirably, the entire side surfaces 138,140 of the speaker are also provided with infrared light reflecting properties. For example, these surfaces can be painted, coated or otherwise colored a light color with white being a specifically desirable example, such as the white described above in connection with exemplary reflective portions of surfaces 160,162. When speaker 48 is mounted or coupled to surface 72, a corner is provided at the intersection of the respective speaker side surfaces 138,140 and the associated portions of surfaces 160, 162. Thus, portions of the exemplary reflective infrared signal reflecting surfaces are thus in planes at right angles with respect to one another. Also, both the speaker side edges and end portion surfaces can be white in color. Less desirably, a flange or other structure projecting outwardly from the base surface 72 can be provided as an infrared reflective surface. It is, however, more desirable to use at least portions, and most desirably the entire side surface, at each side of the speaker for infrared signal reflective purposes. It is also more desirable to use speaker side surfaces for these purposes in combination with at least portions of the outwardly facing surfaces of end portions 160,162 of the base section 62.

An infrared signal passing lens 220 overlays the infrared sensors carried by support 170. Another infrared signal passing lens 224 overlays the infrared signal sensors carried by the strip 172. The interference signal shields 190,192 in this embodiment are interposed between the respective lenses 220,224 and infrared sensors carried by the strips 170,172. With reference to FIGS. 2, 3 and 4, desirably in one example the infrared lenses are each elongated in a top-to-bottom direction so as to extend substantially along the entire length of the respective sides 138,140 of the speakers. Since the infrared lenses can be identical, the following description refers to lens 220. Lens 220 is of an infrared light transmissive material with one example being a red colored plastic, with Polycarbonate (PC) from Teijin Chemicals Ltd, colored iR Red, L-1225T, being a specific example. The illustrated lens 220 has upper and lower infrared light transmitting end cap portions 240,242 and an elongated arcuate outer surface 244 extending between the end caps. Supports, one being numbered 246 in FIG. 4, provide support for the interior edge 248 of the lens 220 adjacent to the outermost edge of side surface 138 of the adjoining speaker. The lower edge 250 of the lens desirably abuts the outer surface of end portion 160 at the side edge thereof. The spaces between the edges of the lens and the base and speaker side surfaces more desirably sealed to block the passage of array light to the infrared sensors supported by the strip 170 that does not pass through the lens 220.

The array of sensors carried by the support 170 can be identical to the array of sensors carried by the support 172. For this reason, only the array 44 carried by the support 170 will be described in connection with FIGS. 5 and 6. It should be noted that the exemplary array is desirable. However, other elongated arrays of infrared sensors can be used. In addition, although additional infrared sensors can be used at other locations, desirably the only infrared sensors that are used to receive infrared signals representing a speaker's voice are the arrays 44 and 46 at the respective sides of the assembly 40. Also, although less desirable, the support 170 can be a portion of end surface 160 instead of a component, such as a circuit board strip, mounted or coupled thereto.

Figure 5:
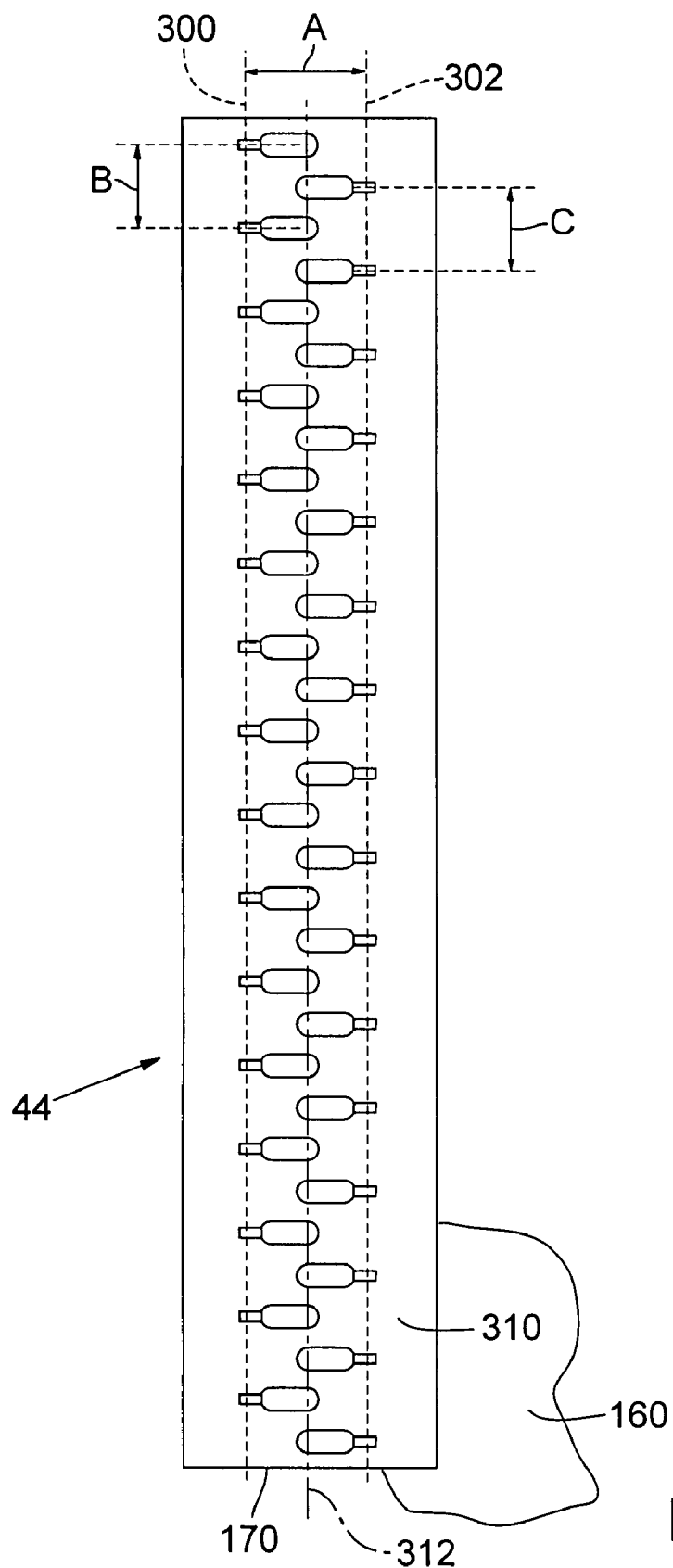
FIG. 5 is a top view of an exemplary infrared sensor array and sensor support that can be used in the embodiment of FIG. 1.
Figure 6:
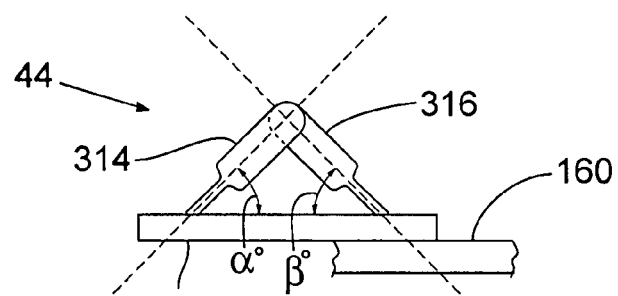
FIG. 6 is an end view of the sensor array of FIG. 5.

With reference to FIGS. 5 and 6, the illustrated array comprises a plurality of rows of diode sensors. In the illustrated example, there are two rows of sensors represented by the numbers 300,302. A first set of sensors, in this case 16 LEDs, are positioned along row 300 at spaced apart locations along the row. An exemplary spacing is 0.4 inch between each diode in the row. Similarly, a second group or set of LEDs are positioned along row 302 at spaced apart locations along the row. Again, 0.4 inch is an exemplary spacing. As can be seen in FIG. 5, in the illustrated example, the LEDs of row 300 are staggered relative to the LEDs along row 302. In addition, although the spacing can vary, in an exemplary spacing between the two rows, indicated by the letter A, is 0.45 inches. The spacing of the diodes along row 300 is indicated by the letter B whereas the spacing between diodes along row 302 is indicated by the letter C. With this staggered arrangement, the diodes can be tilted toward one another so that they are angled with respect to the upper surface 310 of the strip 170. They can thus also be angled with respect to the upper surface of end portion 160 shown in part in FIG. 5. The spacing may and the angling can be such that the tips of the diodes are arranged along a line 312 when the diodes of each row are tilted toward the diodes of the other row.

In FIG. 6, a first diode 314 of row 300 is shown angled at an angle $\alpha°$ with respect to a plane containing the upper surface of the illustrated form of the strip 170, which also corresponds to a plane containing the upper surface of base portion 160 in this example. In addition, a diode 316 of row 302 is shown angled at an angle $\beta°$ relative to these planes. In the illustrated embodiment, $\alpha°$ and $\beta°$ are the same and can be about 45 degrees. It should be noted that this angle can be varied. By angling at least some, and more desirably all, of the diodes in each of the rows, greater sensitivity to incoming infrared signals is achieved.

Figure 7:
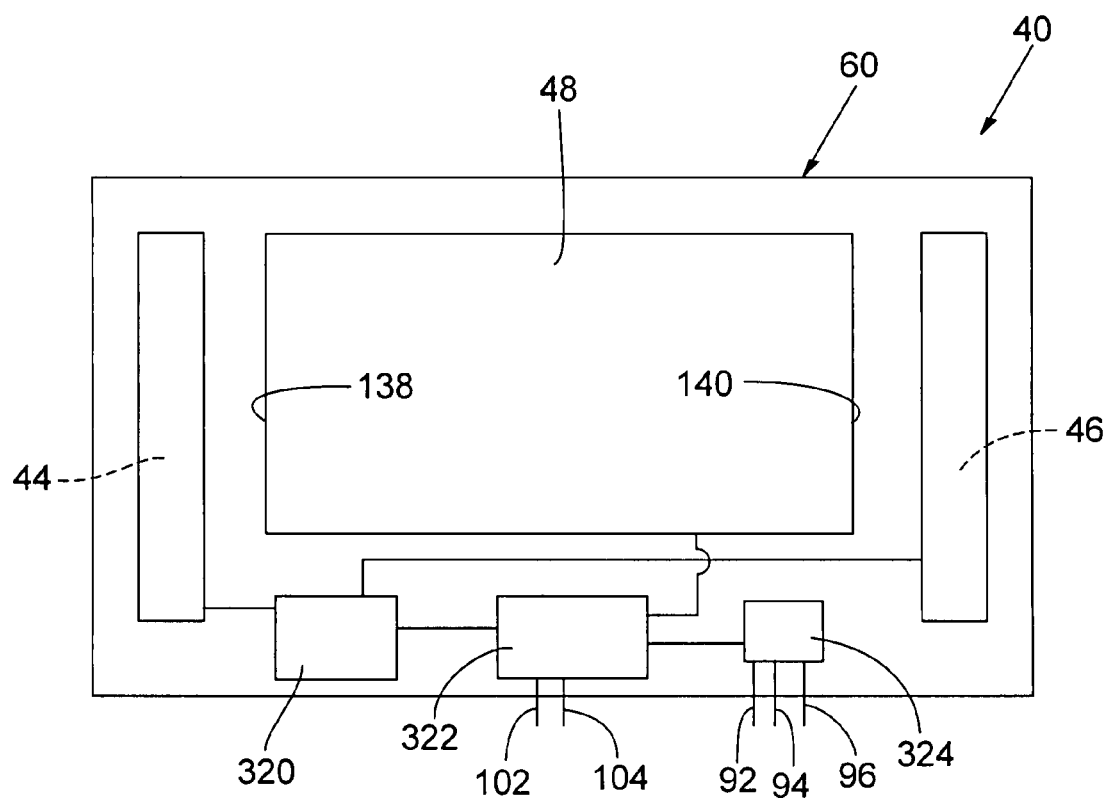
FIG. 7 is a schematic illustration of exemplary components that can be included in an embodiment.

FIG. 7 is a block diagram illustration of one embodiment of the assembly 40. In the embodiment of FIG. 7, the respective infrared signal receiving arrays 44,46 are shown as a block along the respective sides 138,140 of the speaker 48. As one can see from FIG. 2, for example, in a desirable embodiment, the speaker essentially extends from the top of the base 60 to the bottom of the base 60 unlike the block representation thereof shown in FIG. 7. Signals from the infrared signal detection arrays are delivered to a receiver/processing circuit which filters the signals and separates them into channels for amplification by an amplifier 322 for use in driving the speaker 48. For example, one-half of the sensors from each array can be assigned to each channel. Signals from other signal sources, such as a DVD player, can be delivered to a pre-amplifier 324 and to the amplifier 322 for broadcasting via the speaker 48. An output can be taken from the amplifier to drive another audio device.

Having illustrated and described the principles of the technology with reference to several embodiments, it should be apparent to those of ordinary skill in the art that the technology may be modified in arrangement and detail without departing from the inventive principles disclosed herein. I claim all such modifications as fall within the spirit and scope of the following claims.

The invention claimed is:

1. An infrared sensor assembly and speaker support comprising:
   a base;
   a speaker coupled to the base, the speaker comprising a front surface, a back surface, first and second side surfaces and top and bottom surfaces;
   the base comprising first and second infrared sensor support surfaces projecting outwardly beyond the respective first and second speaker side surfaces;
   a first sensor support coupled to the first sensor support surface and a second sensor support coupled to the second sensor support surface;
   a first elongated sensor array comprising a plurality of infrared signal sensors associated with and supported by the first sensor support and a second elongated sensor array comprising a plurality of infrared signal sensors associated with and supported by the second sensor support;
   a first interfering signal shield positioned and operable to shield the first elongated array from infrared interference signals and a second interfering signal shield positioned and operable to shield the first elongated array from infrared interference signals;
   a first infrared signal passing lens overlaying the first elongated array and a second infrared signal passing lens overlaying the second elongated array; and
   a first infrared signal reflective surface positioned at least in part beneath the first lens to reflect infrared signals toward the infrared signal sensors of the first array and a second infrared signal reflective surface positioned at least in part beneath the second lens so as to reflect infrared signals toward the infrared signal sensors of the second array.

2. An apparatus according to claim 1 wherein each of the first and second infrared signal reflecting surfaces comprises a surface extending outwardly in a direction away from the associated sensor support surfaces and toward a surface intersecting the front surface of the speaker.

3. An apparatus according to claim 1 wherein the first infrared sensor support surface of the base has a first side edge, the second infrared sensor support surfaces of the base has a second side edge, the first infrared signal reflective surface comprising a first surface portion extending outwardly in a direction away from the first infrared sensor supporting base at a location spaced inwardly from the first side edge, the second infrared signal reflective surface comprising a second surface portion extending outwardly in a direction away from the second infrared sensor supporting base at a location spaced inwardly from the second side edge, wherein the first lens comprises a first elongated arcuate portion extending from a location adjacent to the first surface portion of the first infrared signal reflective surface to a location adjacent to the first side edge, and the second lens comprises a second elongated arcuate portion extending from a location adjacent to the second surface portion of the second infrared signal reflective surface to a location adjacent to the second side edge.

4. An apparatus according to claim 3 wherein the first infrared signal reflective surface comprises a portion of the first infrared sensor support surface between the first side edge and the first surface portion of the first infrared signal reflective surface and wherein the second infrared signal reflective surface comprises a portion of the second infrared sensor support surface between the second side edge and the second surface portion of the second infrared signal reflective surface.

5. An apparatus according to claim 4 wherein the first and second infrared signal reflective surfaces are white.

6. An apparatus according to claim 1 wherein the first infrared signal reflective surface comprises at least a portion of the first side surface of the speaker and the second infrared signal reflective surface comprises at least a portion of the second side surface of the speaker.

7. An apparatus according to claim 6 wherein at least portions of the first and second side surfaces of the speaker are white and comprise portions of the respective first and second infrared signal reflective surfaces.

8. An apparatus according to claim 7 wherein each of the first and second infrared signal reflective surfaces comprise portions of the first and second infrared sensor support surfaces of the base that are white.

9. An apparatus according to claim 1 wherein the infrared signal reflecting surfaces are white.

10. An apparatus according to claim 1 wherein each of the infrared signal reflecting surfaces comprise first and second surface portions that are at right angles to one another and that define a corner therebetween, the first infrared sensor support surface terminating at a first side of the base in a first side edge and the second infrared support surface terminating at a second side of the base in a second side edge, the corner of the first infrared signal reflecting surface being spaced from the first side edge and the corner of the second infrared signal reflecting surface being spaced from the second side edge.

11. An apparatus according to claim 10 wherein the first surface portion comprises at least a portion of the first speaker side surface and wherein the second surface portion comprises at least a portion of the second speaker side surface.

12. An apparatus according to claim 1 wherein the first elongated sensor array is along a first side of the speaker and the second elongated sensor array is along a second side of the speaker.

13. An apparatus according to claim 1 wherein the speaker is rectangular having first and second sides and wherein the first sensor array comprises plural sensors positioned along the first side of the speaker and the second sensor array comprises plural sensors positioned along the second side of the speaker.

14. An apparatus according to claim 13 comprising a support coupled to the base to support the base in an upright orientation.

15. An infrared sensor assembly and speaker comprising:
a base comprising a top edge, a bottom edge and first and second side edges, the base also comprising an outwardly facing speaker mounting surface;
a speaker mounted to the speaker mounting surface, the speaker having first and second speaker side portions, the base being wider than the speaker such that first and second projecting side portions of the base project outwardly beyond the respective first and second speaker side portions;
a first array comprising plural infrared signal sensors carried by the first projecting side portion and positioned along the first speaker side portion, a second array comprising plural infrared signal sensors carried by the second projecting side portion and positioned along the second speaker side portion; and
at least portions of first and second speaker side portions being white.

16. An apparatus according to claim 15 wherein the speaker is rectangular and all of the infrared signal sensors of the apparatus are included in the first and second arrays.

17. An apparatus according to claim 15 wherein the speaker is rectangular and wherein the first and second arrays each comprise parallel rows of infrared sensors that are parallel to the side portions of the speaker.

18. An apparatus according to claim 15 wherein at least portions of the first and second projecting side portions of the base are white.

19. An infrared sensor assembly and speaker support comprising:
a rectangular flat panel speaker having an outwardly facing sound projecting surface, a top portion, a bottom portion and first and second side portions;
a base comprising a speaker support to which the speaker is coupled;
first and second elongated arrays each comprising plural infrared signal sensors, the first array being supported by the base and positioned along the first side portion of the speaker and the second array being supported by the base and positioned along the second side portion of the speaker; and
at least portions of each of the speaker side portions and of each of the array supporting portions of the base being white so as to reflect infrared signals toward the adjacent arrays of infrared signal sensors.

20. An apparatus according to claim 19 wherein the base is adapted for support with the speaker side portions in an upright orientation.

21. An apparatus according to claim 19 wherein substantially all of each of the side portions of the speaker are white.

\* \* \* \* \*